Jan. 19, 1960 S. C. HETH 2,921,426

CROP CRUSHING DEVICE WITH LAMINATED RUBBER IMPREGNATED FIBRE DISC CRUSHING ROLLS

Filed Jan. 17, 1958 3 Sheets-Sheet 1

Inventor
Sherman C. Heth
Paul O. Pippel
Attorney

Jan. 19, 1960

S. C. HETH 2,921,426

CROP CRUSHING DEVICE WITH LAMINATED RUBBER IMPREGNATED FIBRE DISC CRUSHING ROLLS

Filed Jan. 17, 1958

3 Sheets-Sheet 2

Inventor
Sherman C. Heth
Paul O. Pippel
Attorney

Jan. 19, 1960 S. C. HETH 2,921,426

CROP CRUSHING DEVICE WITH LAMINATED RUBBER IMPREGNATED FIBRE DISC CRUSHING ROLLS

Filed Jan. 17, 1958 3 Sheets-Sheet 3

Inventor
Sherman C. Heth
Paul O. Pippel
Attorney

Patented Jan. 19, 1960

1

2,921,426

CROP CRUSHING DEVICE WITH LAMINATED RUBBER IMPREGNATED FIBRE DISC CRUSHING ROLLS

Sherman C. Heth, Chicago, Ill., assignor to International Harvester Company, Chicago, Ill., a corporation of New Jersey Application January 17, 1958, Serial No. 709,668

7 Claims. (Cl. 56—1)

This invention relates to machines for processing hay and the like in the field to accelerate curing thereof and more particularly the invention pertains to hay crushers.

Currently there are on the market various types of hay crushers and crimpers. The hay crushers distinguish from the crimpers in that former attempt to actually physically crush the stems whereas the crimpers are usually intermeshing gear type roll devices which comprise meshing teeth between which the hay is adapted to be moved so that it is bruised along the contact points between the teeth.

In all of these machines the principal problem which has seriously limited the operation of the machine has been the inability of the crushing rolls to act uniformly or substantially so upon all of the material passing between the rolls and particularly when the material would bunch. This would cause the rolls to gap at opposite sides of the bunch or thick wad so that there was very little pressure exerted by the rolls against the material passing through the gaps.

A general object of the invention is to provide a novel crushing unit which incorporates rolls made of yieldable material pressed together in deforming contact with each other in order to provide extensive crushing and grasping areas.

A further object of the invention is to provide a novel crushing unit wherein the crushing rolls are made up of a plurality of rubber or elastomer impregnated fiber disks of tire carcass material which includes fiber or cord interspersed in rubber-like material wherein the material provides numerous tentacles for grasping hay and the like, and pulling it through the rolls.

A still further object of the invention is to provide a pair of crushing rolls wherein the rolls are made up of a series of individual side-by-side disks clamped together so that the rolls are thus segmented to obtain regional flexing and thus accommodate the even mat of material passing between the rolls.

A still further object of the invention is to provide a novel release mechanism for the crushing rolls whereby if the rolls should become choked, a simple and effective mechanism is provided for separating the rolls to pass the material therebetween and unplug the unit.

These and other objects of the invention will become more apparent from the specification and the drawings wherein.

2

Figure 9:
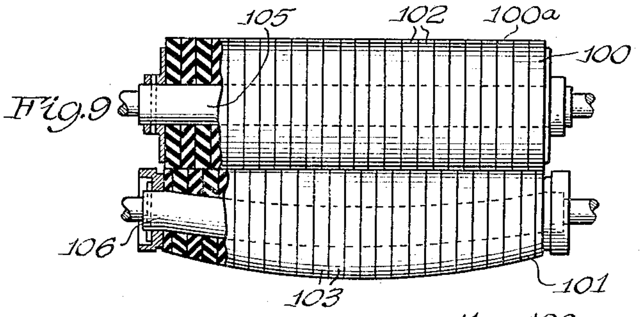
Figure 8:
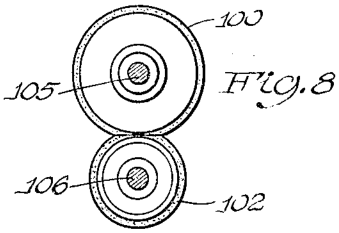
Figure 10:
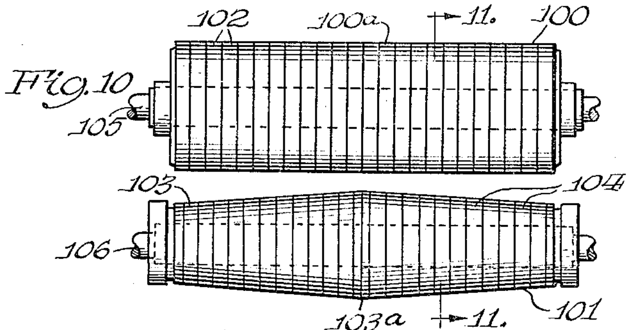
Figure 11:
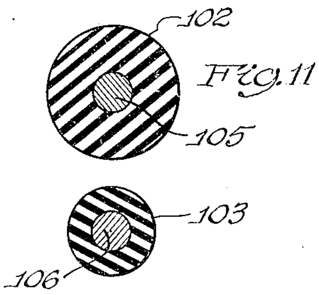
Figure 12:
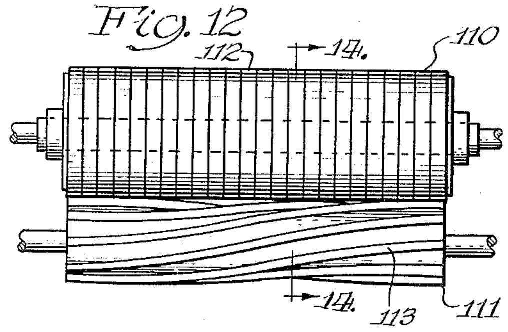
Figure 13:
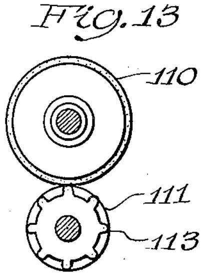
Figure 17:
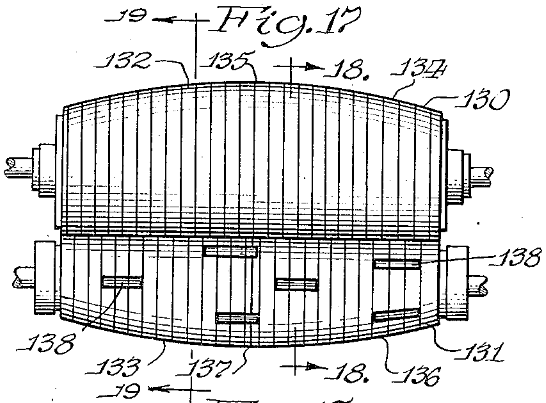
Figure 14:
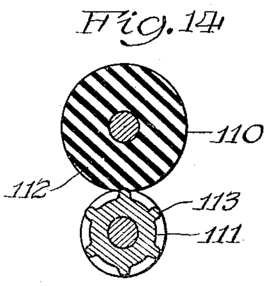
Figure 15:
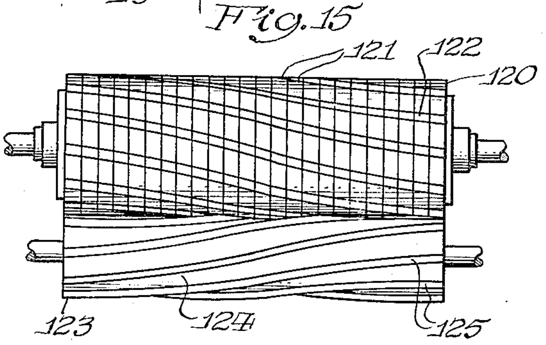
Figure 16:
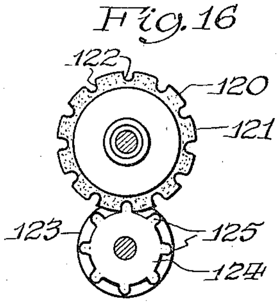
Figure 19:
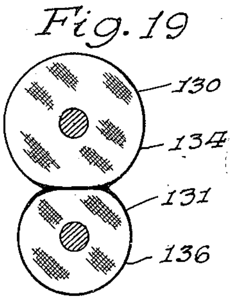
Figure 18:
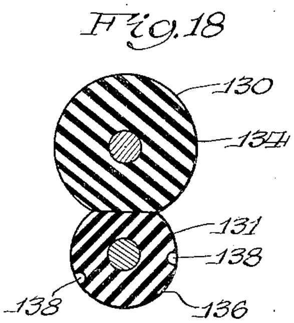

Figures 8 through 11 illustrate a modified form of crushing rolls, Figure 8 being an end view, Figure 9 a side elevational view partially in axial section showing the rolls compressed, Figure 10 being a side elevational view showing the rolls separated and Figure 11 being a cross sectional view taken substantially on the line 11—11 of Figure 10;

Figures 12–14 illustrate the further embodiment of crushing rolls, Figure 12 being a side elevational view and Figure 13 being an end view and Figure 14 a cross-section on line 14—14 of Figure 12;

Figures 15 and 16 show a further embodiment of the invention, Figure 15 being a side elevational view, and Figure 16 being an end view;

Figures 17 and 18 show a still further embodiment of crushing rolls, Figure 17 being a side elevational view partially in longitudinal section, and Figure 18 being a cross sectional view taken substantially on the line 18—18 of Figure 18; and Figure 19 is a sectional view taken substantially on the line 19—19 of Figure 17.

Describing the invention in detail the crusher generally designated 2 comprises a fore and aft extending frame-work 3 which includes a pair of forwardly converging beam members 4 and 5 joined into a hitch structure 6′ by means of which the unit is adapted to be connected to an associated tractor.

The members 4 and 5 are connected intermediate their ends to a front beam 6 and at the rear ends to a transverse beam member 7, the ends of the beam member 7 being connected to fore and aft extending angle irons or side braces 8 and 9 which at their forward ends are connected through brackets 10 to the tubular rockshaft *6a*.

The rockshaft *6a* is rotatable within the brackets 10 and at opposite ends mounts rearwardly extending arms 11 and 12 which at their rearward ends are provided with outwardly extending spindles 13 and 14 which mount the supporting wheels 15 and 16.

The wheels 15 and 16 are disposed outwardly of the side panels 20 and 21 of the machine, said panels 20 and 21 being connected to the members 8 and 9 respectively and depending therefrom and receiving a pair of upper and lower rollers 22, 23 therebetween. It will be seen that the top roll 22 is substantially larger diametrically than the bottom roll 23.

Roll 22 is made up of a plurality of disks 24 which are made of tire carcass, that is, a rubber-impregnated cord fabric and these disks 24 form the body of the laminated roll and are each provided with a center opening 25 by which they sleeve onto a shaft 26 between the end caps 27 and 28 between which they are held under extremely high pressure, the cap 28 preferably being secured as by a pin 29 on the shaft 26 in order to make the assembly removable with respect to the shaft. Similarly the roll 23 is a laminated or segmental structure comprising a plurality of disks 30 which are of the character of tire carcass material that is rubber impregnated fiber disks, said disks each having a center opening 31 by which means the disks are sleeved on the shaft 32 and held in assembly between the end caps 33 and 34, cap 34 being releasably interlocked with the shaft 32 by a pin 35 extending through the shaft 32 outwardly of the cap 34, said caps 33 and 34 holding the said disks 30 at great pressure therebetween to provide a unitary structure.

Figure 4:
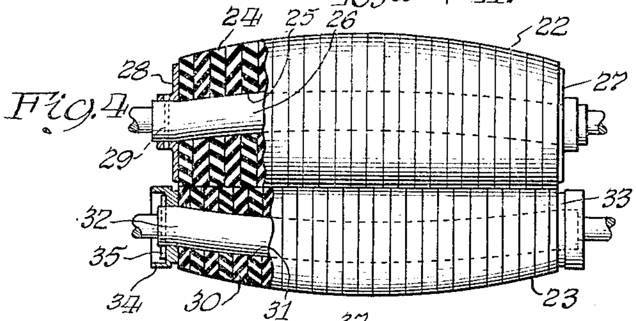
Figures 4 through 7 illustrate the preferred form of crushing rolls, Figure 4 being a side elevational view partially in axial section showing the rolls engaged, Figure 5 being an end view, Figure 6 being a side elevational view illustrating the rolls separated, Figure 7 being a cross sectional view taken substantially on the line 7—7 of Figure 6.
Figure 5:
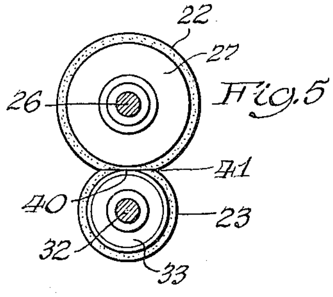
Figure 6:
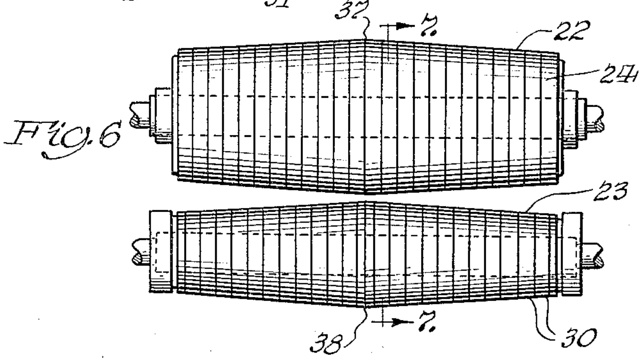
Figure 7:
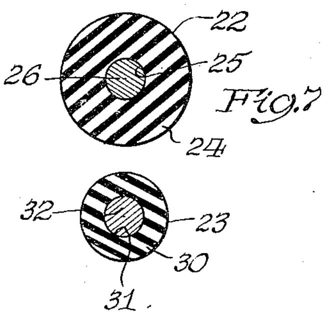

It will be seen that both of the rolls 22 and 23 are crowned at their center portions 37 and 38 and that the disks at the center are of course the largest in diameter and are gradually reduced in diameter as they approach each end of the roll. The function of crowning these rolls is to account for the deflection of the long rolls and the shafts as the two rolls are pressed against each other as shown in Figures 4 and 5 in order to provide an extensive crushing and grasping area 40 therebetween. This feature solves the problem of insuring proper engagement between the rolls along their full extent. By segmenting the rolls in providing a series of individual disks, the rolls are afforded individually flexible segments to accommodate nonuniform bunching of the material along the length of the rolls. Furthermore, we have found through actual use of this equipment in the field that the imbedded fiber in the disks provide tentacles which serve to grasp the cut hay which is laying in a swathe on the field along which the machine is advanced with the bite 41 between the rolls facing forwardly into the direction of travel of the machine in order to draw the material through the rolls between which it is crushed.

The lower or driven roll is carried by its shaft 32 on bearings 44, 45 rigidly mounted on the side walls 20 and 21 of the unit transverse to the direction of travel of the machine and shaft 32 is provided with a sprocket 47 driven by chain 48 on the sprocket 49 which is mounted on the countershaft 50 which is carried by bearing 51 on the member 8, the shaft being connected through a gear box 52 to a forwardly extending transmission shaft 53 which is adapted for connection to the power take-off of the associated tractor as is well known to those skilled in the art.

The upper roll 22 is carried at each end on a bearing 55 which is mounted on an arm 56 intermediate the ends thereof. It will be seen that the shaft 26 projects through a vertically elongated slot 57 in each end wall 20 and 21 whereby the upper roll is movable vertically with respect to the lower roll. The forward end of the arm 56 is pivotally mounted as at 60 on the rockshaft 6*a* and the rear end of the arm 56 is provided with an upstanding ear 61 which at its upper end is pivotally connected as at 62 on an axis transverse to the plane of the arm 56 and generally parallel to the axis at 60 to a cross shaft or cross head 63. It will be seen from Figure 2 that the cross member 63 extends across the width of the machine and that each arm 56 is pivoted similarly to the adjacent end of the member 63. Each end of the cross head member 63 is carried by a toggle linkage 65.

Each of these linkages comprises top and bottom links 66 and 67, link 67 comprising a pair of straps 68 which at their lower ends receive the shaft 63, the straps 68 being pivoted on a generally horizontal axis as by pin 69 at their lower ends, the axis of pin 69 extending diametrically with respect to the shaft 63. Each link 66 is pivotally connected at its upper end by a crank structure 70 to an upstanding bracket 71 and the links 66, 67 are interconnected at their adjacent ends by a common transverse pin 71 to the adjacent end of a push rod 72 which is urged in the direction of the toggle by the compression spring 73 which extends generally parallel to the member 63, spring 73 being under compression between the abutments 74 on the adjacent ends of the rods 72. Thus it will be seen that the upper roll is continuously biased downwardly against the driving roll.

In order to release the rolls when the amount of material intended to pass through should become too large there is provided a release mechanism including a hydraulic ram which comprises a cylinder 75 pivoted at one end as at 76 by a bracket 77 to the frame structure 3, namely, the frame member 4, the cylinder 75 carrying the piston and stem assembly 78 therein, the stem being pivoted as at 79 to the upper end of an arm 80 which is integrally connected with the rockshaft 6*a* whereby extension of the ram rotates the rockshaft in the direction raising the unit by rotating the arms 11 and 12 of the wheel and axle assembly downwardly. The rockshaft 6*a* is provided with an integral depending arm 81 which at its lower end is pivotally connected as at 82 to the forward end of a cam member 83, said cam member comprising a fore and aft extending portion 84 which has a generally horizontal flat upper edge 85 located beneath the bearing 55 and extending rearwardly therefrom. The upper edge 85 merges into an upwardly and rearwardly projecting diagonal cam profile or edge 86 on the wide rear portion 87 of the cam member, the edge 86 adapted to engage with the periphery 88 of the bearing 55 which carries the roller 22 as the cam member is pulled forwardly due to counterclockwise rotation of the rockshaft 6*a*. There is also provided on the portion 84 a flat generally horizontal bottom edge surface 90 which travels on a roller 91 which is spindled on a shaft 92 which is mounted on the adjacent side walls 20 and 21. The roller 91 is adapted to engage with a downwardly and rearwardly extending cam edge or profile 93 on the portion 83 at the moment the edge 86 engages the bearing 55 whereby after a predetermined amount of rise in the machine attendant to rotation of the rockshaft 6*a* the shaft 26 with the roller 22 is cammed upwardly between the roller 91 and the cam member 83 whereby the arm 56 is swung upwardly about its forward pivot 60 with attendant compression of the spring 73 through jackknifing of the links 67 of the toggles 65.

Figure 1:
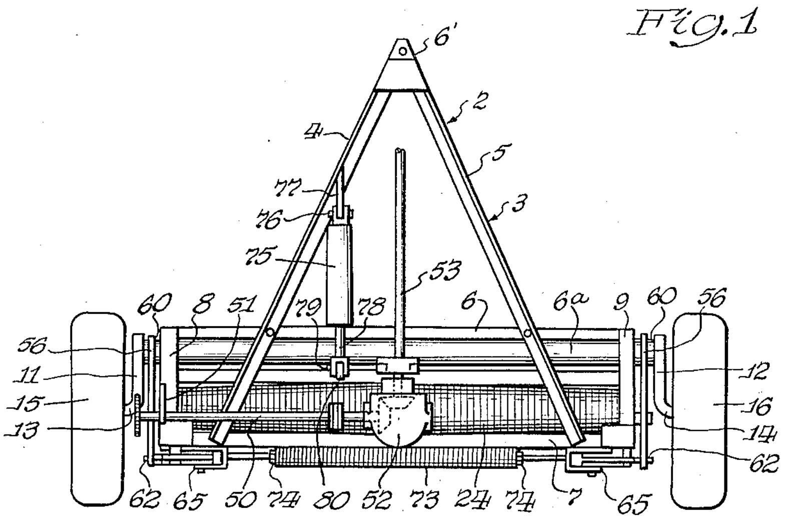
Figure 1 is a plan view of a novel crusher incorporating the invention.
Figures 2, 3:
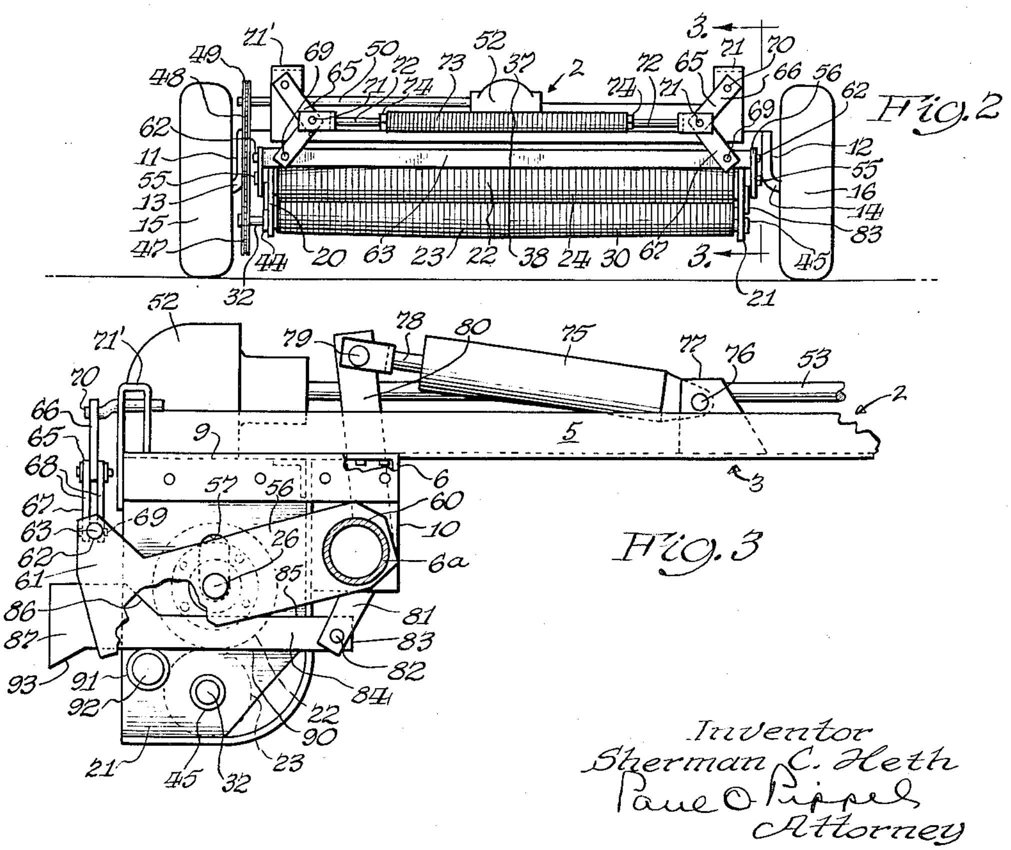
Figure 2 is a rear view of the crusher unit.
Figure 3 is a sectional view taken substantially on the line 3—3 of Figure 2 with portions of the structure broken away in order to more clearly illustrate different aspects of the invention.

In order to reengage the rollers, the ram unit is retracted and the motion thus is reversed, the unit being lowered to operating position with the cam disengaged and assuming the position shown in Figure 3 whereupon the upper roll is brought into engagement with the lower roll and the unit is thus ready for operation.

Referring now to the embodiment of the invention shown in Figures 9 to 11 it will be seen that the upper and lower rolls 100, 101 are somewhat similar to the rolls 22 and 23 with the exception that the upper roll 100 has a substantially cylindrical body portion 100*a* and the lower roll 101 is crowned or tapered so that the individual disks 102 of the upper roll are of uniform diameter whereas the disks of 103 of the lower roll gradually diminish in diameter toward each end of the roll, the center disks being of course the largest and the peripheries 104 being frusto-conical and the center disk 103*a* being double tapered. This construction also tends to compensate for the deflection of the rolls as they are pressed toward each other in order to prevent gapping therebetween due to the deflection of the shafts 105 and 106 thereof.

Referring now to the invention shown in Figures 12–14, the upper and lower rolls 110 and 111 are both cylindrical; the upper roll having a plurality of rubber impregnated discs 112 and the lower roll being preferably metallic and having spiral grooves 113.

Referring now to the embodiment of Figures 15 and 16 the upper roll 120 has a body 121 of laminated rubber impregnated discs 121′ with spiral grooves 122 and the lower roll 123 is preferably metallic with a cylindrical body 124 provided with spiral metallic ribs 125 which mesh with respective grooves 122.

Referring to Figures 17 and 18, the embodiment shows upper and lower rolls 130 and 131, having laminated bodies 132 and 133, respectively. The rubber impregnated fiber discs 134 of the upper roll being tapered toward each end of the body to provide a center crown 135 and the lower roll having its body composed of a series of rubber impregnated fiber discs 136 which taper toward each end of the body to provide a center crown 137. To increase the aggressiveness of the pick-up and crushing roll 131, I provide about 4″ staggered grooves 138 in the discs of the body of the lower roll so as to feed the material adequately into the bite 139. The flexibility of these rolls, and their crowning continuously flexes the same so as to constantly knead any mud, which may accumulate, out from the grooves.

I claim:

1. A hay crusher comprising a mobile support, a pair of peripherally coacting crushing rolls rotatably mounted on said support, each of said rolls comprising a supporting shaft and roll body, said roll body composed of disc-like fabric members imbedded in rubber-like material and compacted under high axial pressure into a unitary member.

2. The invention according to claim 1 and pressure applying means interconnected with the ends of the shaft of at least one of said rolls for engaging the rolls under pressure deforming the bodies of said rolls to an extent providing a wide area of contact therebetween.

3. The invention according to claim 1 and driving means connected to at least one of said shafts for driving the rolls.

4. The invention according to claim 1 and the body of at least one of said rolls being crowned at the center and being of maximum diameter intermediate its ends and tapering to minimum diameter at opposite ends.

5. The invention according to claim 1 and the bodies of both of said rolls being crowned and having a maximum diameter intermediate their ends and tapering to smaller diameter at opposite ends.

6. The invention according to claim 1 and at least one of said rolls having a plurality of peripheral grooves in said body thereof.

7. The invention according to claim 1 and the bodies of both of said rolls being crowned and having a maximum diameter intermediate their ends and tapering to smaller diameter at opposite ends, and at least the body of one of said rolls having a plurality of peripheral grooves therein.

References Cited in the file of this patent

UNITED STATES PATENTS

| | | |
|---|---|---|
| 2,191,144 | Hornbostel | Feb. 20, 1940 |
| 2,416,124 | Siemen | Feb. 18, 1947 |
| 2,464,974 | Garvey | Mar. 22, 1949 |
| 2,645,812 | Jensen | July 21, 1953 |
| 2,732,591 | Whittum | Jan. 31, 1956 |
| 2,753,788 | Getz | July 10, 1956 |
| 2,771,078 | Summers | Nov. 20, 1956 |
| 2,790,290 | Tufford | Apr. 30, 1957 |
| 2,811,819 | Heth | Nov. 5, 1957 |